J. JAY.
Coffee Roaster.
No. 97,644.
Patented Dec. 7, 1869.
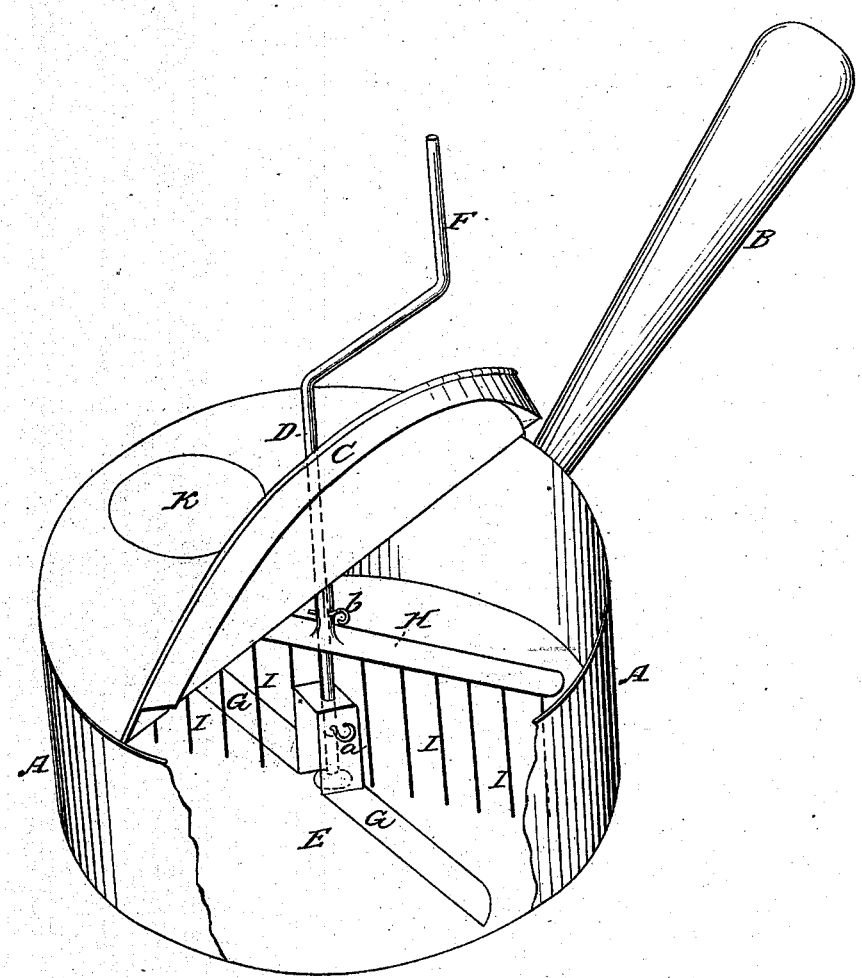

United States Patent Office.

JOHN JAY, OF JONESBOROUGH, INDIANA.

Letters Patent No. 97,644, dated December 7, 1869.

COFFEE-ROASTER.

The Schedule referred to in these Letters Patent and making part of the same.

*To all whom it may concern:*

Be it known that I, JOHN JAY, of Jonesborough, in the county of Grant, and State of Indiana, have invented a new and useful Improved Coffee-Roaster; and I do hereby declare the following to be a full, clear, and exact description thereof, which will enable others skilled in the art to which my invention appertains, to make and use the same, reference being had to the accompanying drawings, forming part of this specification, in which the figure is a perspective view of my improved coffee-roaster, part of the case being broken away to show the stirrers.

My invention has for its object to provide a portable coffee-roaster, which shall be simple in construction, and capable of being converted into a device for popping corn.

It consists in a cylindrical case, composed of sheet-metal, or other suitable material, and provided with a vertical crank-shaft, upon which are arranged, within the case, and at right angles to each other, two horizontal stirrers, one serving to lift the coffee from the bottom of the case, to prevent its burning, while the other thoroughly stirs and agitates the entire mass.

In the accompanying drawings—

A is a cylindrical case, composed of sheet-metal, or other suitable material, and provided with a lateral handle, B, and hinged cover C.

D is a vertical shaft, passing centrally through the top of the case, and stepped at its lower end in the bottom E, while its upper end forms a crank-handle, F.

To the lower end of this shaft is secured, by a pin, *a*, a flat strip or plate of metal, G, placed horizontally upon the bottom of the case A, and adapted to revolve in contact, or nearly in contact therewith, as the shaft D is operated.

Upon the shaft D, a short distance above the plate G, and at right angles thereto, is secured, by a pin, *b*, a horizontal bar or plate, H.

This bar is provided with pendent teeth or arms I, whose lower ends are nearly in contact with the bottom of the case A.

The operation is as follows:

The case A, containing the requisite quantity of coffee, is placed upon a stove or other heater, and the shaft D operated by its crank-handle. The arms or plates G H are thus caused to rotate within the case. The former, sweeping over the bottom E, lifts the coffee therefrom, and prevents its burning, while the arms I of the latter stir it thoroughly throughout.

K is an opening in the top or fixed portion of the cover, provided with wire gauze or rods, to permit the escape of the fumes of the roasting coffee, and to permit the inspection of the latter from time to time.

By removing the pins *a b*, the shaft D and plates G H may be taken out of the case A, and the latter used for popping corn, or for other purposes.

When used as a corn-popper, the corn can be observed through the opening K in the cover, but is prevented from flying out by means of the wire-gauze covering.

My improved coffee-roaster is simple in construction, can be manufactured at a trifling expense, and, from the fact of its portability, supplies an article of trade long required.

Having thus described my invention,

What I claim as new, and desire to secure by Letters Patent, is—

1. The removable vertical crank-shaft D, and the removable horizontal stirrers G and H I, in combination with the portable case A, substantially as herein shown and described, for the purpose specified.

2. As an improved article of manufacture, the portable coffee-roaster, consisting of the case A, provided with the handle B, hinged cover C, and opening K, and the removable crank-shaft D, and stirring-plates G and H I, all arranged and operating as herein shown and described, for the purpose specified.

The above specification of my invention signed by me, this 18th day of October, 1869.

JOHN JAY.

Witnesses:
M. V. WHITSON,
JOSEPH HOLLINGSWORTH.